United States Patent [19]

Claar et al.

[11] Patent Number: 4,940,679
[45] Date of Patent: Jul. 10, 1990

[54] PROCESS FOR PREPARING SELF-SUPPORTING BODIES AND PRODUCTS MADE THEREBY

[75] Inventors: Terry D. Claar, Newark, Del.; Steven M. Mason, Norwood, Pa.; Kevin P. Pochopien, Newark, Del.; Danny R. White, Elkton, Md.

[73] Assignee: Lanxide Technology Company, LP, Newark, Del.

[21] Appl. No.: 137,044

[22] Filed: Dec. 23, 1987

Related U.S. Application Data

[63] Continuation-in-part of Ser. No. 73,533, Jul. 15, 1987.

[51] Int. Cl.$^5$ .......................... C04B 35/58; B22F 3/26
[52] U.S. Cl. ........................................ 501/96; 501/99; 501/102; 419/2; 419/23; 419/57
[58] Field of Search ...................... 501/90, 96, 99, 102; 419/2, 19, 23, 57

[56] References Cited

U.S. PATENT DOCUMENTS

| | | | |
|---|---|---|---|
| 3,758,662 | 9/1973 | Tobin et al. | 264/332 |
| 3,864,154 | 2/1975 | Gazza et al. | 501/90 X |
| 4,471,059 | 9/1984 | Yoshino et al. | 501/98 X |
| 4,595,545 | 6/1986 | Sane | 501/87 X |
| 4,692,418 | 9/1987 | Boecker et al. | 501/90 |
| 4,702,770 | 10/1987 | Pyzik et al. | 75/236 |
| 4,713,360 | 12/1987 | Newkirk et al. | 501/98 |
| 4,718,941 | 1/1988 | Halverson et al. | 75/236 |
| 4,777,014 | 10/1988 | Newkirk et al. | 501/96 X |

FOREIGN PATENT DOCUMENTS

| | | |
|---|---|---|
| 0165707 | 12/1985 | European Pat. Off. |
| 0239520 | 3/1986 | European Pat. Off. |
| 0193292 | 9/1986 | European Pat. Off. |
| 1492477 | 4/1975 | United Kingdom |

*Primary Examiner*—Peter A. Nelson
*Attorney, Agent, or Firm*—Mark G. Mortenson; William E. McShane

[57] ABSTRACT

Self-supporting bodies are produced by reactive infiltration of a parent metal into boron carbide typically resulting in a composite comprising a boron-containing compound and metal. The mass to be infiltrated may contain one or more inert fillers admixed with the boron carbide, or at least one carbon donor material, to produce a composite by reactive infiltration, which composite comprises a matrix of metal and boron-containing compound embedding the filler. In one embodiment of the invention, a parent metal is reactively infiltrated into a mass comprising a boron carbide material mixed with a carbon-containing compound. In this embodiment, a self-supporting composite is formed typically comprising a boron-containing compound, a carbon-containing compound, and metal. The relative amounts of reactants and process conditions may be altered or controlled to yield a body containing varying volume percents of ceramic, metal and/or porosity. The mass to be infiltrated can be contained within a refractory vessel having a venting means included therein.

44 Claims, 5 Drawing Sheets

PROCESS FOR PREPARING SELF-SUPPORTING BODIES AND PRODUCTS MADE THEREBY

CROSS-REFERENCE TO RELATED APPLICATION

This application is a continuation-in-part of application Ser. No. 073,533, filed July 15, 1987, in the names of Danny R. White, Michael K. Aghajanian, and T. Dennis Claar, and entitled "Process for Preparing Self-Supporting Bodies and Products Made Thereby". This application is also related to co-pending U.S. application Ser. No. 837,448, filed Mar. 7, 1986, now U.S. Pat. No. 4,777,014 issued Oct. 11, 1988, in the names of Marc S. Newkirk, et al, and entitled "Process for Preparing Self-Supporting Bodies and Products Made Thereby".

FIELD OF THE INVENTION

This invention relates generally to a novel method of preparing self-supporting bodies, and to novel products made thereby. In its more specific aspects, this invention relates to a method of producing self-supporting bodies comprising one or more boron-containing compounds, e.g. a boride or a boride and carbide, by reactive infiltration of a molten parent metal into a bed or mass containing boron carbide, a carbon donor material (i.e., a carbon-containing material) and, optionally, one or more inert fillers, to form the body.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al; B-Al; $B_4$C-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

SUMMARY OF THE INVENTION

In accordance with the present invention, self-supporting ceramic bodies are produced utilizing a parent metal infiltration and reaction process (i.e. reactive infiltration) in the presence of boron carbide. A bed or mass of boron carbide is infiltrated by molten parent metal, and the bed may be comprised entirely of boron carbide, resulting in a self-supporting body comprising one or more parent metal boron-containing compounds, which compounds include a parent metal boride or a parent metal boro carbide, or both, and typically also may include a parent metal carbide. Alternatively, the mass to be infiltrated may contain one or more inert fillers admixed with the boron carbide to produce a composite by reactive infiltration, which composite comprises a matrix of one or more boron-containing compounds and also may include a parent metal carbide. In both embodiments, the final product may include a metal as one or more metallic constituents of the parent metal. Still further, in some cases it may be desirable to add a carbon donor material (i.e., a carbon-containing compound) to the boron carbide, the carbon donor material being capable of reacting with the parent metal to form a parent metal-carbide phase, thereby modifying resultant mechanical properties of the composite body. The reactant concentrations and process conditions may be altered or controlled to yield a body containing varying volume percents of ceramic compounds, metal and/or porosity.

Broadly, in the method of this invention, a mass comprising boron carbide is placed adjacent to or contacted with a body of molten metal or metal alloy, which is melted in a substantially inert environment within a particular temperature envelope. The molten metal infiltrates the mass and reacts with the boron carbide to form one or more reaction products. The boron carbide is reducible, at least in part, by the molten parent metal to form the parent metal boron-containing compound, e.g. a parent metal boride and/or boro compound, under the temperature conditions of the process. Typically a parent metal carbide is also produced, and in certain cases a parent metal boro carbide is produced. At least a portion of the reaction product is maintained in contact with the metal, and molten metal is drawn or transported toward the unreacted boron carbide by wicking or capillary action. This transported metal forms additional parent metal boride, carbide, and/or boro carbide, and the formation or development of a ceramic body is continued until the parent metal or boron carbide has been consumed, or until the reaction temperature is altered to be outside the reaction temperature envelope. The resulting structure comprises one or more of a parent metal boride, a parent metal boro compound, a parent metal carbide, a metal (which as used herein is intended to include alloys and intermetallics), or voids, or a combination thereof, and these several phases may or may not be interconnected in one or more dimensions. The final volume fractions of the boron-containing compounds (i.e. boride and boro compounds), carbon-containing compounds, and metallic phases, and the degree of interconnectivity, can be controlled by changing one or more conditions, such as the initial density of the boron carbide body, the relative amounts of boron carbide and parent metal, alloying the parent metal, dilution of the boron carbide with a filler, temperature and time.

Moreover, by adding a carbon donor material (e.g., graphite powder or carbon black) to the mass of boron carbide, the ratio of parent metal-boride/parent metal-carbide can be adjusted. For example, if zirconium is used as the parent metal, the ratio of $ZrB_2/ZrC$ can be reduced (i.e., more ZrC is produced due to the addition of a carbon donor material in the mass of boron carbide).

Typically, the mass of boron carbide will be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another embodiment, a composite is produced by the transport of molten parent metal into a bedding of boron carbide admixed with one or more inert filler materials. In this embodiment, boron carbide is incorporated into a suitable filler material, which then is placed adjacent to or in contact with the molten parent metal. This setup may be supported on or in a separate bed that is substantially non-wettable by and non reactive with the molten metal under the process conditions. The molten parent metal infiltrates the boron carbide-filler mixture and reacts with the boron carbide to form one or more boron-containing compounds. The resulting self-supporting ceramic-metal composite typically is a dense microstructure which comprises a filler embedded by a matrix comprising boron-containing compound(s), and also may include a carbide and metal. Only a small amount of boron carbide is required to promote the reactive infiltration process. Thus, the resulting matrix can vary in content from one composed primarily of metallic constituents thereby exhibiting certain properties characteristic of the parent metal; to cases where a high concentration of the boron carbide is used in the process, thereby producing a significant boron-containing compound(s) phase which, together with any carbon-containing compounds, dominate the properties of the matrix. The filler may serve to enhance the properties of the composite, lower the raw materials cost of the composite, or moderate the kinetics of the boron-containing compound(s) and/or carbon-containing compound formation reactions and the associated rate of heat evolution.

In a further embodiment, the material to be infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of carbide and parent metal.

DETAILED DESCRIPTION OF THE INVENTION AND PREFERRED EMBODIMENTS

In accordance with the invention, a self-supporting body is produced by the reactive infiltration of a molten parent metal with boron carbide to form a polycrystalline ceramic-containing body comprising the reaction product(s) of the parent metal with boron carbide, and also may include one or more constituents of the parent metal. The boron carbide, typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) usually a parent metal carbide, and (d) metal. The constituents and proportions in the product depend largely on the choice and composition of parent metal and the reaction conditions. Also, the self-supporting body produced may exhibit porosity or voids.

In the preferred embodiments of the present invention, the parent metal and a mass or bedding of boron carbide are positioned adjacent each other so that reactive infiltration will be in the direction towards and into the bedding. The bedding, which may be preshaped, may include a filler material, such as a reinforcing filler, which is substantially inert under the process conditions. The reaction product can grow into the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with the boron carbide, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include metal, e.g. aluminum, and possibly other unreacted or unoxidized constituents of the parent metal. If zirconium is the parent metal, the resulting composite comprises zirconium boride and zirconium carbide. Also, zirconium metal may be present in the composite.

Although the present invention is hereinafter described with particular reference to certain preferred embodiments in which the parent metal is zirconium or aluminum, this is for illustrative purposes only. Other parent metals also may be used such as silicon, titanium, hafnium, lanthanum, iron, calcium, vanadium, niobium, magnesium, chromium and beryllium, and examples for several such parent metals are given below.

Figure 1:
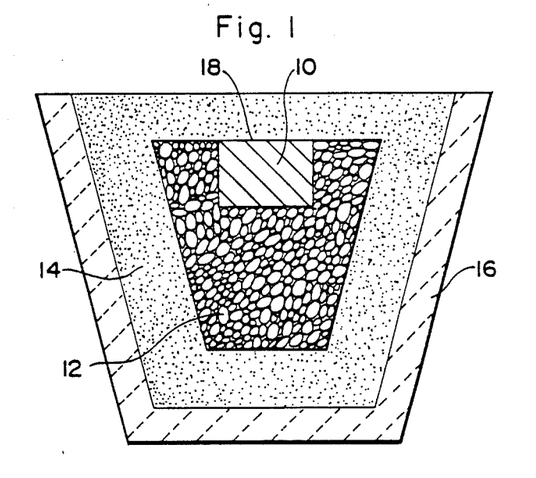
FIG. 1 is a schematic elevational view in cross-section showing a parent metal ingot embedded in a particulate of boron carbide within a refractory crucible, to be processed in accordance with the invention.

Referring to FIG. 1, the parent metal 10 as the precursor, e.g. zirconium, is formed into an ingot, billet, rod, plate, or the like. The metal is at least partially embedded in particulate boron carbide 12, preferably having a particle size of from about 0.1 μm to 100 μm. This setup or assembly is surrounded by an inert material 14, typically in particulate form, which is not-wettable by and nonreactive with the molten metal under the process conditions, and contained within a crucible 16 or other refractory vessel. The top surface 18 of the parent metal may be exposed, or the parent metal may be completely embedded or surrounded by the boron carbide, and also the inert bed 14 may be omitted. This assembly is placed in a furnace and heated, preferably in an inert atmosphere such as argon, above the melting point of the parent metal but preferably below the melting point of the desired reaction product so as to form a body or pool of molten metal. It should be understood that the operable temperature range or preferred temperature may not extend over this entire interval. The temperature range will depend largely upon such factors as the composition of the parent metal and the desired phases in the resulting composite. Molten metal contacts the boron carbide, and a parent metal boride (e.g. zirconium diboride) and a parent metal metal carbide (e.g. zirconium carbide) are formed as the reaction product. Upon continued exposure to the boron carbide, the remaining molten metal is progressively drawn through the reaction product in the direction of and into the mass containing the boron carbide, to provide continued formation of reaction product at the interface between the molten metal and boron carbide. The product produced by this method comprises the reaction product(s) of the parent metal with the boron carbide, or may comprise a ceramic-metal composite to include further one or more unreacted or non-oxidized constituents of the parent metal. A substantial amount of the boron carbide is reacted to form the reaction product(s), preferably this amount being at least about 50% and most preferably at least about 90%. The ceramic crystallites formed as the reaction product by the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (as in the case where stoichiometric reactants or excess boron carbide is present), but the volume percent of voids will depend on such factors as temperature, time, type of parent metal, and the porosity of the mass of boron carbide.

Figure 3:
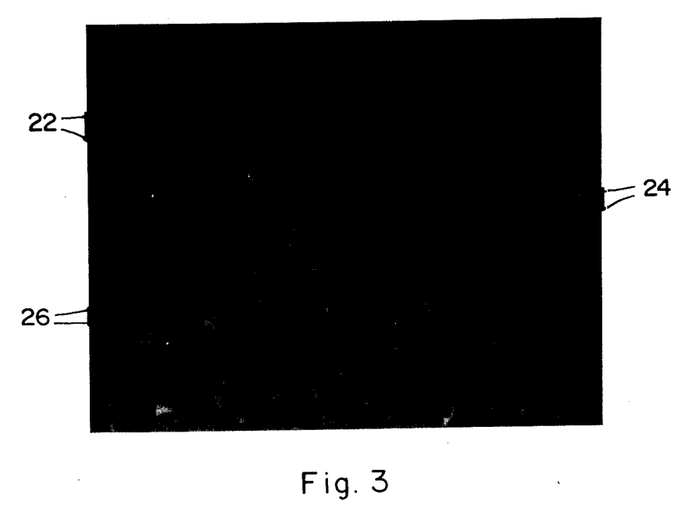
FIG. 3 is a photomicrograph at 1000X magnification of a section of a ceramic composite formed by the method described in Example I.
Figure 4:
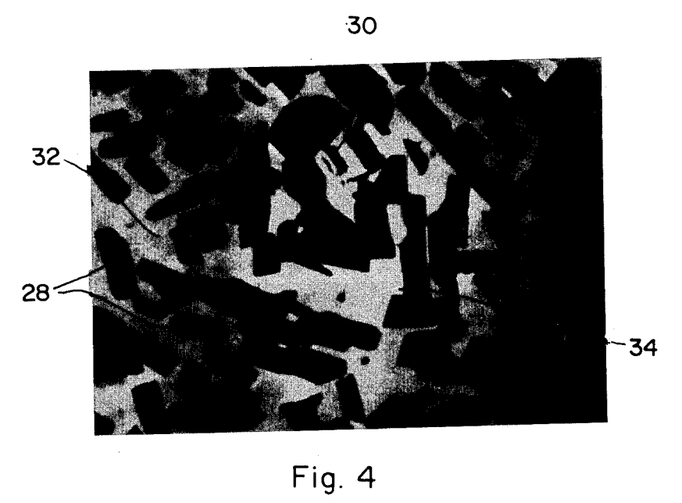
FIG. 4 is a photomicrograph at 1500X magnification of a section of a ceramic composite formed by the method described in Example VI.
Figure 5:
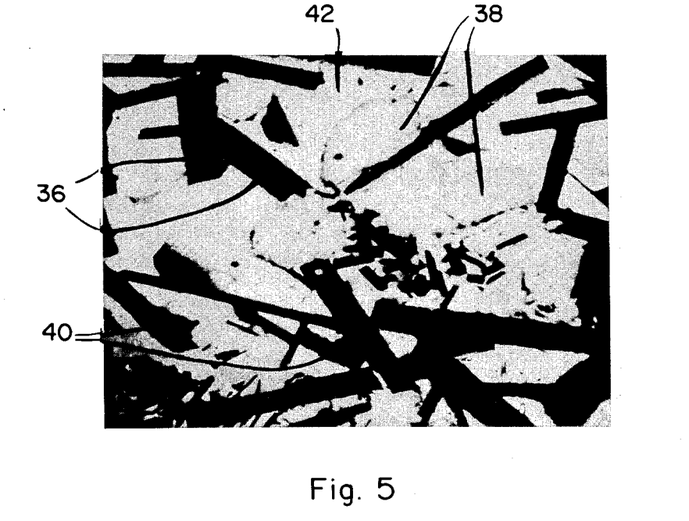
FIG. 5 is a photomicrograph at 1500X magnification of a section of a ceramic composite formed by the method of Example VIII.

It has been observed that products made in accordance with this invention using zirconium, titanium and hafnium as the parent metal form a parent metal boride characterized by a platelet-like structure. These platelets typically are unaligned or randomly oriented, as can be seen in FIGS. 3, 4 and 5. This platelet-like structure and the metallic phase appear to account at least in large part for the extraordinarily high fracture toughness of this composite, about 12 mega Pascals meters$^{\frac{1}{2}}$ or higher, because of crack deflection and/or pull-out mechanisms.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately mixed with boron carbide. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces or the like, to render the filler material permeable to the infiltration of molten parent metal. Further the filler material may be homogeneous or heterogeneous. If desired, these materials may be bonded with any suitable binding agent (e.g. Avicil PH 105, from FMC Co.) which does not interfere with the reactions of this invention or leave any undesirable residual by-products within the final composite product. A filler which would tend to react excessively with the boron carbide or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

Figure 6:
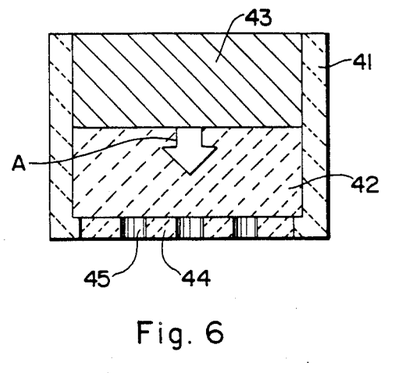
FIG. 6 is a schematic elevational view in cross-section showing a preform in contact with a parent metal, both of which are contained in a refractory vessel.
Figure 7:
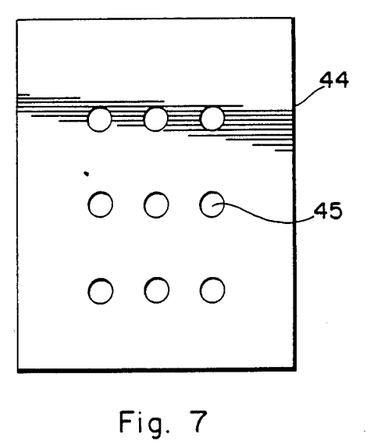
FIG. 7 shows a bottom view of the refractory vessel shown in FIG. 6.

A suitable refractory container holding the parent metal and a bed or volume of filler with admixed boron carbide properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron carbide, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The of, for example, argon gas which has been trapped in the preform as the parent metal reactive infiltration front infiltrates the preform. FIG. 6 and FIG. 7 show a preform 42 in contact with a parent metal ingot 43, both of which are contained in a graphite refractory vessel 41. The graphite refractory vessel 41 has a bottom portion 44 having therein a plurality of through-holes 45 which function as a venting means. The through-holes 45 permit any gas trapped in the preform (e.g., argon) to escape as the parent metal reactive infiltration front infiltrates the preform (i.e., the reactive infiltration front penetrates the preform in the direction of the arrow "A" in FIG. 6). Thus, porosity in the formed composite body can be reduced.

Figure 2:
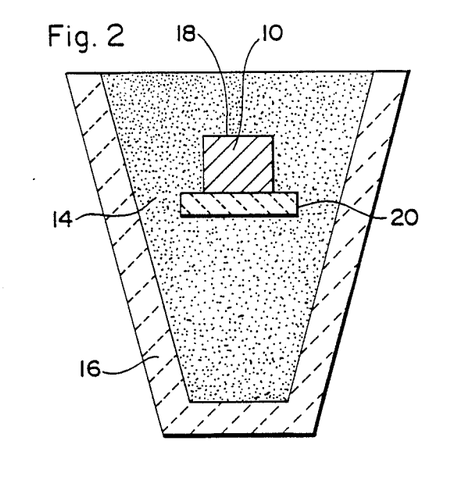
FIG. 2 is a schematic elevational view in cross-section showing a parent metal ingot positioned adjacent a preform of boron carbide and embedded in an inert bed contained within a refractory crucible, to be processed in accordance with the invention.

A composite made by practicing this invention is illustrated in FIG. 2. The boron carbide, together with any desired inert filler materials, is fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable byproducts to the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

It has been discovered that infiltration of the permeable filler by the parent metal is promoted by the presence of a boron carbide in the filler. A small amount of boron carbide has been shown to be effective, but the minimum can depend upon a number of factors such as type and particle size of the boron carbide, type of parent metal, type of filler, and process conditions. Thus, a wide variation of boron carbide concentrations can be provided in the filler, but the lower the concentration of boron carbide, the higher the volume percent of metal in the matrix. When very low amounts of the boron carbide are used, e.g. one to three weight percent based on the total weight of boron carbide plus filler, the resulting matrix is interconnected metal and a limited amount of parent metal boride and parent metal carbide dispersed in the metal. In the absence of boron carbide, reactive infiltration of the filler may not occur, and infiltration may not be possible without special procedures, such as the application of external pressure to force the metal into the filler.

Because a wide range of boron carbide concentrations in the filler can be used in the process of this invention, it is possible to control or to modify the properties of the completed product by varying the concentration of boron carbide and/or the composition of the bed. When only a small amount of boron carbide is present relative to the amount of parent metal, such that the mass comprises a low density of boron carbide, the composite body or matrix properties are dominated by the properties of the parent metal, most typically ductility and toughness, because the matrix is predominately metal. Such a product may be advantageous for low or mid-range temperature applications. When a large amount of boron carbide is used, as for example when compound(s) having boron carbide particles are densely packed around a filler material or occupy a high percentage of space between constituents of the filler, the resulting body or matrix properties tend to be dominated by the parent metal boride and any parent metal carbide, in that the body or matrix would be harder or less ductile or less tough. If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal, e.g. aluminum, present in the product. Where desired, elemental carbon may be admixed with the boron carbide bed or preform containing boron carbide and a filler. This excess carbon, typically varying from about 5 to 10 weight percent of the total bedding, reacts with the parent metal thereby assuring substantially complete reaction of the metal. This reaction of the metal with the carbon will depend largely on the relative amount of carbon used, the type, e.g. carbon black or graphite, and crystallinity. Selection among these extreme characteristics may be highly desirable to meet the needs of different potential applications for these products. For example, by adding about 5-75, preferably about 5-50, percent by weight of carbon black to a $B_4C$ preform and reactively infiltrating the preform with a zirconium metal, the ratio of $ZrB_2/ZrC$ can be lowered (i.e., more $ZrC$ is formed).

Also, elemental boron may be admixed with the boron carbide bed (including a bed with filler) to facilitate reactive infiltration, particularly when using aluminum as the parent metal. Such an admixture reduces the cost of the bed relative to all boron carbide, results in the formation of a product containing a boro carbide such as aluminum boro carbide which possesses certain properties comparable to aluminum boride, and prevents the formation of aluminum carbide which is unstable in the presence of moisture and therefore degrades the structural properties of the product. In the admixture, the parent metal reacts with the elemental boron preferentially to form a metal boride, but the boro compound is formed as well.

Additional variations in the characteristics and properties of the composite can be created by controlling the infiltration conditions. Variables which can be manipulated include the nature and size of the particles of boron carbide material, and the temperature and time of infiltration. For example, reactive infiltration involving large boron carbide particles and minimum exposure times at low temperatures will result in a partial conversion of the boron carbide to parent metal boron and parent metal carbon compound(s). As a consequence, unreacted boron carbide material remains in the microstructure, which may impart desirable properties to the finished material for some purposes. Infiltration involving the boron carbide particles, high temperatures and prolonged exposure times (perhaps even to hold at temperature after infiltration is complete) will tend to favor substantially complete conversion of the parent metal to the parent metal boride and carbon compound(s). Preferably, conversion of the boron carbide to the parent metal boride, parent metal boro compound(s) and parent metal carbide is at least about 50%, and most preferably at least about 90%. In filtration at high temperatures (or a subsequent high temperature treatment) also may result in densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 to 25 volume percent, and sometimes higher, depending upon the several factors or conditions enumerated above.

The following Examples illustrate the novel reaction products of this invention and the method by weight they are prepared; however, these Examples are illustrative only and they are not intended to limit the invention claimed. The test procedures for measuring certain properties of specimens prepared in these examples were as follows:

The room temperature four-point flexure tests were conducted in a Model 1123 Instron test machine using procedures outlined in U.S. Army MIL-STD-1942 (MR). The specimens were bars measuring 3×4×50 mm. Their tensile surfaces were surface ground using a 500 grit diamond wheel, and their corners chamfered to eliminate chips and other defects. The steel flexure fixture had a 20 mm inner span and a 40 mm outer span. Flexural strengths were calculated from the peak breaking loads and the specimen and fixture dimensions using elastic beam equations.

The fracture toughness was determined by testing flexural bars measuring 5×4×50 mm. A chevron notch with an included angle of 60° was machined at the mid lengths of the specimens with a 0.3 mm wide diamond blade. Then, four-point chevron flexure tests were conducted by the same methods described for the flexural strengths.

The density was determined by weighing and measuring rectangular blocks.

The elastic modulus was determined by the sonic resonance technique, using the procedure described in ASTM C623-71. The samples measured approximately 5×4×45 mm, and were all machined with a series of diamond cutting and grinding operations. Three modes of vibration were separately stimulated in each bar, namely, the torsional mode, the flexural mode perpendicular to the 5 mm width, and the flexural mode perpendicular to the 4 mm width. In each case, the fundamental harmonic resonant frequency was determined. The flexural resonances provided measurements of Young's modulus (E), and the torsional resonance provided measurements of the shear modulus (G).

The hardness was determined by using the A scale on a Rockwell hardness tester and following the procedure described in ASTM E18-84. The goal of the tests was to obtain a hardness value representative of the composite as a whole rather than of single phase regions.

EXAMPLE I

A 2-inch square by ⅜-inch thick preform was prepared by admixing 95% by weight $B_4C$ (1000 grit) and 5% by weight of an organic binder (Acrawax-C from Lonza, Inc.), then cold pressing the composition in a steel die with the specified geometry at 5,000 psi. A 2-inch square by ⅜-inch thick plate of zirconium was placed on top of, and in contact with, the $B_4C$ particulate preform and the entire setup was placed in a graphite mold.

The assembly, consisting of the graphite mold and its contents, was placed in a resistance-heated vacuum furnace supplied with argon gas flowing at 2 liters/minute. The assembly was heated from room temperature to 450° C. over a period of 2.5 hours to burn out the organic binder. It was then heated to a 1950° C. setpoint temperature over a five-hour period and maintained at 1950° C. for 2 hours. The assembly was allowed to cool for five hours prior to removal from the furnace.

After the assembly was removed from the furnace, the unreacted zirconium was mechanically removed from the surface of the setup by grinding, and a powdered sample of the underlying ceramic composite was recovered and subjected to x-ray diffraction analysis.

This analysis showed the presence of $ZrB_2$, $ZrC$, and $Zr$. Further tests revealed that the ceramic composite had the following properties: an average density (g/cc) of about 6.2; an elastic modulus (GPa) of 380; a flexural strength (MPa) of 875; and a critical stress intensity factor (fracture toughness) of 15 (MPa m$^{\frac{1}{2}}$).

FIG. 3 is a photomicrograph at 1000X magnification of a cross-section of the composite product showing $ZrB_2$ as 22, $ZrC$ as 24, and $Zr$ as 26. The $ZrB_2$ phase in this composite appeared in the form of platelets, which are unaligned or randomly oriented.

EXAMPLE II

A zirconium metal ingot measuring ½ inch in diameter and ¾ inch tall was embedded in particulate boron carbide (Atlantic Equipment Engineers, Bergenfield, NJ, $B_4C$ 99.7%, 1–5 micron) contained within an alumina crucible. The assembly, consisting of the alumina crucible and its contents, was placed in an induction furnace supplied with argon gas flowing at 300 cc/minute. The assembly was heated to 1800° C. (as measured by an optical pyrometer) over a period of 6 minutes and then maintained at 1800° C. for 4 minutes before it was allowed to cool.

After the assembly was removed from the furnace, a powdered sample of the resulting ceramic composite was recovered and subjected to x-ray diffraction analysis. This analysis showed the presence of $ZrB_2$, $ZrC$ and $Zr$. The $ZrB_2$ phase in this composite appeared in the form of platelets.

EXAMPLE III

A preform measuring 2¼-inch square and ½-inch thick was prepared by admixing 93% by weight boron carbide ($B_4C$) particles of 320 mesh size and 7% by weight of organic binder (Avicil PH 105 from FMC Co.) and then cold pressing the admixture in a steel die with the specified geometry at 10,000 psi. A 2-inch square and ½-inch thick aluminum alloy, designated 1100, was placed on top of, and in contact with, the $B_4C$ preform and the entire setup was embedded in alumina particles (E38 Alundum from Norton Co., 90 grit) contained in a refractory vessel, as illustrated in FIG. 2.

The assembly, consisting of the refractory vessel and its contents, was heated to a 1200° C. setpoint temperature, over a ten-hour period, in a resistance heated vacuum furnace supplied with argon gas flowing at 1 liter/min. After the 1200° C. temperature was maintained for 24 hours, the assembly was allowed to cool for six hours prior to removal from the furnace.

After the assembly was removed from the furnace, the unreacted aluminum on the surface of the setup was removed mechanically and a small amount of the underlying ceramic composite was reduced to powder. This powder was subjected to x-ray diffraction analysis which showed the presence of Al, $B_4C$, $Al_2O_3$ and $Al_8B_4C_7$. Further tests showed that the resulting ceramic composite had the following properties: a density (g/cc) of 2.58; an elastic modulus (GPa) of 189; a hardness (Rockwell A) of 46; a flexural strength (MPa) of 254±3; and a fracture toughness (MPam$^{\frac{1}{2}}$) of 10.2±0.1.

EXAMPLE IV

A preform measuring 2¼-inch square and ½-inch thick was prepared from a uniform mixture comprised of 94% by weight $B_4C/B$ (in an admixture of 50% by weight, 320 mesh $B_4C$; and 50% by weight, −38 micron B), and 6% by weight of organic binder (Avicil PH 105 from FMC Co.) The preform was prepared by cold pressing the mixture in a steel die with the specified geometry at 10,000 psi. A two-inch square and ½-inch thick aluminum alloy, designated 1100, was placed on top of, and in contact with, the $B_4C/B$ particulate preform and the entire setup was embedded in alumina particles (38 Alundum from Norton, Co., 24 grit) contained in a refractory vessel, as illustrated in FIG. 2.

The assembly, consisting of the refractory vessel and its contents, was placed in a resistance-heated tube furnace supplied with argon gas flowing at 300 cc/min, heated to a 1200° C. setpoint temperature over a ten-hour period, and maintained at 1200° C. for 36 hours. The assembly was allowed to cool for ten hours prior to removal from the furnace.

After the assembly was removed from the furnace, the unreacted aluminum on the surface of the setup was mechanically removed and a powdered sample of the underlying ceramic composite was subjected to x-ray diffraction analysis. This analysis showed that the ceramic composite contain Al, $\beta$-$AlB_{12}$, $Al_3B_{48}C_2$, and an unidentified phase, dwith a "d" spacing (lattice spacing) of 2.926, 2.679, 2.087, 1.84 and 1.745 Å with relative intensities of 100, 36, 40, 20 and 73, respectively. Further tests determined that the composite had the following properties: a density (g/cc) of 2.58; an elastic modulus (GPa) of 215; a flexural strength (MPa) of 196±9; and a fracture toughness (MPa m$^{\frac{1}{2}}$) of 8.1±0.3.

EXAMPLE V

A preform measuring 2¼-inch square and ½-inch thick was prepared by the technique described in Example I except that the uniform mixture here was comprised of 94% by weight $B_4C/B$ (in an admixture of 50% by weight, 320 mesh $B_4C$; and 50% by weight, 38 micron and finer B), and 6% by weight of the same binder. A two-inch square and ½-inch thick plate of aluminum alloy Al-10Si-3Mg (10% by weight Si, 3% by weight Mg, and the balance Al) was placed on top of, and in contact with, the $B_4C/B$ particulate preform and the entire setup was embedded in alumina particles (38 Alundum from Norton, Co., 24 grit) contained in a refractory vessel, as illustrated in FIG. 2.

The assembly, consisting of the refractory vessel and its contents, was placed in a resistance-heated vacuum furnace supplied with argon gas flowing at 1 liter/min, heated to a 1200° C. setpoint temperature over a ten-hour period, and maintained at 1200° C. for 12 hours. The assembly was allowed to cool for five hours prior to removal from the furnace.

After the assembly was removed from the furnace, the unreacted aluminum on the surface of the setup was mechanically removed, and a powdered sample of the underlying ceramic composite was recovered and subjected to x-ray diffraction analysis. This analysis showed that the ceramic composite contained Al, Si, $B_4C$, $\beta$-$AlB_{12}$, $Al_2O_3$, and $Al_8B_4C_7$. Further tests showed that the composite had the following properties: a density (g/cc) of 2.55; an elastic modulus (GPa) of 213; a hardness (Rockwell A) of 57; a flexural strength (MPa) of 231±31; and a fracture toughness (MPa m$^{\frac{1}{2}}$) of 9.1±0.1.

EXAMPLE VI

A 99.64% pure titanium metal ingot (grade 2) measuring ⅜ inch in diameter and ¾ inch tall was embedded in particulate boron carbide (Atlantic Equipment Engineers, Bergenfield, NJ, $B_4C$ 99.7%, 1–5 micron) contained within an alumina crucible. The assembly, consisting of the alumina crucible and its contents, was placed in an induction furnace supplied with argon gas flowing at 300 cc/minute. The assembly was heated to the point where the titanium melted (about 1700°–1750° C. was measured by an optical pyrometer) over a 4 minutes period, and then allowed to cool.

After the assembly was removed from the furnace, a powdered sample of the resulting ceramic composite was recovered and subjected to x-ray diffraction analysis. This analysis showed the presence of $TiB_2$, TiB, TiC and Ti.

FIG. 4 is a photomicrograph at 1500X magnification of a cross-section of the composite product showing $TiB_2$ as 28, TiB as 30, TiC as 32 and Ti as 34. The $TiB_2$ phase appeared in platelet-like structure.

EXAMPLE VII

A cylindrical sample of 99.64% pure titanium (grade2) measuring ⅜ inch diameter by ¾ inch in length was embedded in boron carbide (1000 grit) contained in an alumina crucible. The assembly, consisting of the alumina crucible and its contents, was placed in a resistance heated vacuum furnace supplied with argon gas flowing at 500 cc/min. The assembly was heated to a setpoint temperature of 1750° C. over a period of 3 hours, and then maintained at 1750° C. for 3 hours and 20 minutes.

After the assembly was removed from the furnace and cooled, a powdered sample of the resulting ceramic composite product was recovered and subjected to x-ray diffraction analysis. This analysis showed the presence of $TiB_2$, TiC and $Ti_3B_4$.

A sample of the product was subjected to a Knoop microhardness test as described in ASTM E384-73, using a 200 gf load, which indicated a microhardness of 1815–1950 kg/mm$^2$.

EXAMPLE VIII

A 98.20% pure hafnium metal ingot measuring ⅜ inch in diameter and ¾ inch tall was embedded in particulate boron carbide (−325 mesh) contained within an alumina crucible. The assembly, consisting of the alumina crucible and its contents, was placed in an induction furnace supplied with a gas consisting of 1% hydrogen and 99% argon, by volume, flowing at 500 cc/minute. The assembly was heated to 2300° C. (as measured by an optical pyrometer) over an 8 minute period, and then allowed to cool.

After the assembly was removed from the furnace, examination of the recovered sample showed that there was a very clean cylindrical void where the hafnium ingot had been. This indicates that the shape replication ability of this system is good. A powdered sample of the ceramic composite product obtained through this experiment was recovered and subjected to x-ray diffraction analysis. This analysis showed the presence of $HfB_2$, HfC, Hf and minor amounts of $B_4C$.

FIG. 5 is a photomicrograph at 1500X magnification of a cross-section of the composite product showing $HfB_2$ as 36, HfC as 38, $B_4C$ as 40 and Hf as 42. The $HfB_2$ had a platelet structure.

As described above, other parent metals, different concentrations of starting materials and other variations such as density in packing, nature of the boron carbide particles, time and temperature may be used to alter or control the final product. Materials of this type would be useful for such applications as engine or rocket components.

EXAMPLE IX

A preform measuring 2 inches square and ½-inch thick was prepared by a similar technique to the technique described in Example I. However, the preform comprised about 95 percent by weight $B_4C$ (1000 grit from ESK) and about 5 percent by weight carbon black (991-UP from Cancarb Inc.) which functioned as both the carbon donor material and the binder. Specifically, the preform was formed by cold pressing the admixed starting materials in a steel die at about 1000 psi. A 2-inch square by ⅜-inch thick plate of zirconium parent metal (Grade 702 Zr from Teledyne Wah Chang Albany) was placed on top of, and in contact with, the cold pressed $B_4C$ preform. The entire setup was then placed in a graphite mold, as shown in FIG. 6. Specifically, the $B_4C$ preform 42 was contacted with a zirconium parent metal ingot 43, both of which were contained in a graphite (Grade ATJ from Union Carbide) refractory vessel 41 (the graphite vessel 41 may or may not include holes 45).

The assembly, consisting of the graphite mold and its contents, was placed in a resistance-heated vacuum furnace. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 250° C. over a period of about 30 minutes. The furnace was then heated from about 250° to about 450° C. at a rate of 100° C. per hour. The furnace chamber was backfilled with argon which remained flowing at a rate of about one liter per minute and was maintained at a pressure of about 2 psi. The furnace was heated to a temperature of about 1900° C. over a five-hour period and then held at about 1900° C. for about two hours. The furnace was then cooled for about five hours.

After the assembly was removed from the furnace, quantitative image analysis was performed on the composite body. Particularly, the ratio of $ZrB_2C/ZrC$ was experimentally determined to be about 1.03. This ratio can be compared with a standard ratio of $ZrB_2/ZrC$ which is about 1.39 (i.e., the ratio of $ZrB_2/ZrC$ in a preform not having any carbon added thereto). Accordingly, it is clear that the $ZrB_2/ZrC$ ratio can be adjusted by adding a carbon donor material to a $B_4C$ preform prior to reactively infiltrating the preform.

EXAMPLE X

A preform measuring 2 inches square and ⅜-inch thick was prepared by a similar technique to the technique described in Example I. The preform comprised about 95 percent by weight $B_4C$ (1000 grit from ESK) and about 5 percent by weight organic binder (Acrawax-C from Lonza, Inc.). The preform was formed by cold pressing the admixed starting materials in a steel die at 5000 psi. A 2-inch square by ⅜-inch thick plate of zirconium parent metal (Grade 702 Zr from Teledyne Wah Chang Albany) was placed on top of, and in contact with, the cold-pressed $B_4C$ preform. The entire setup was then placed in a graphite (Grade ATJ from Union Carbide) mold, as shown in FIG. 6. Moreover, a bottom portion 44 of the graphite mold 41 contained therein a plurality of through-holes 45. The approximate dimension of the bottom portion 44 was about 2-inch×2-inch. There were nine through-holes placed in the bottom portion 44 of the graphite mold 41, each of the through-holes having a diameter of about 1/16 inch.

The assembly, consisting of the graphite mold and its contents, was placed in a resistance-heated vacuum furnace. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 250° C. over a period of about 30 minutes. The furnace was thereafter heated from about 250° C. to about 450° C. at a rate of 100° C. per hour. The furnace was then backfilled with argon which then remained flowing at a rate of about two liters per minute and was maintained at a pressure of about 2 psi. The furnace was heated to a temperature of about 1900° C. over a 5-hour period and then held at about 1900° C. for about two hours. The furnace was then cooled for about five hours.

For comparison purposes, an identical setup was prepared, except that no through-holes were provided in a bottom portion of the graphite mold.

After each assembly was removed from the furnace, a comparison of the amount of porosity in each of the composite bodies was made. It was discovered that the amount of porosity contained in the composite body manufactured with a graphite mold having through-holes therein was less than the amount of porosity contained in a composite body manufactured with a graphite mold which did not have through-holes therein. Accordingly, it is readily apparent that use of through-holes in a graphite mold can reduce the amount of porosity in a composite body which is produced by reactive infiltration of a parent metal into a $B_4C$ preform.

What is claimed is:

1. A method for producing a self-supporting body, comprising:
   selecting a parent metal comprising at least one metal selected from the group consisting of titanium, zirconium, hafnium, vanadium, chromium and niobium;
   heating said parent metal in a substantially inert atmosphere to a temperature above its melting point to form a body of molten parent metal;
   contacting said body of molten parent metal with a permeable mass comprising boron carbide and a carbon donor material;
   maintaining said temperature for a time sufficient to permit infiltration of said molten parent metal into said permeable mass and to permit reaction of said molten parent metal with both said carbon donor material and said boron carbide to form at least one parent metal carbon-containing compound and at least one parent metal boron-containing compound; and
   continuing said infiltration and reaction for a time sufficient to react said boron carbide substantially completely to produce said self-supporting body comprising at least one parent metal carbon-containing compound and at least one parent metal boron-containing compound.

2. The method of claim 1, wherein said carbon donor material comprises a material selected from the group consisting of graphite powder and carbon black.

3. The method of claim 1, wherein said self-supporting body comprises a parent metal boride compound and a parent metal carbon compound, formed upon reaction of said boron carbide and said parent metal.

4. A method for producing a self-supporting body comprising:
   selecting a parent metal comprising at least one metal selected from the group consisting of titanium, zirconium, hafnium, vanadium, chromium and niobium;
   heating said parent metal in a substantially inert atmosphere to a temperature above its melting point to form a body of molten parent metal, and contacting said body of molten parent metal with a mass comprising boron carbide and boron;
   maintaining said temperature for a time sufficient to permit infiltration of molten parent metal into said mass and to permit reaction of said molten parent metal with said boron carbide and boron to form parent metal boron-containing compounds; and
   continuing said infiltration and reaction for a time sufficient to react said boron carbide substantially completely to produce said self-supportng body comprising at least one parent metal boride.

5. The method of claim 1, wherein said parent metal comprises zirconium, and said self-supporting body comprises a zirconium compound having at least one phase selected from the group of phases consisting of a boride of zirconium, and a mixture of a boride of zirconium and a carbide of zirconium.

6. The method of claim 1, wherein said carbon donor material comprises carbon black present in an amount of about 5–75 weight percent.

7. The method of claim 1, wherein said carbon donor material comprises carbon black present in an amount of about 5–50 weight percent.

8. The method of claim 1, wherein said carbon donor material comprises carbon black present in an amount of about 5 weight percent.

9. The method of claim 8, wherein said parent metal comprises zirconium, and a ratio of $ZrB_2/ZrC$ is about 1.

10. A method for producing a self-supporting body, comprising:
    selecting a parent metal comprising at least one metal selected from the group consisting of titanium, zirconium, hafnium, vanadium, chromium and niobium;
    heating said parent metal in a substantially inert atmosphere to a temperature above its melting point to form a body of molten parent metal;
    contacting said body of molten parent metal with a mass comprising boron carbide;
    containing said mass of boron carbide and said body of molten parent metal within a graphite mold, said graphite mold including a venting means;
    maintaining said temperature for a time sufficient to permit infiltration of said molten parent metal into said mass and to permit substantially complete reaction of said molten parent metal with said boron carbide to form at least one boron-containing compound; and
    continuing said infiltration and reaction for a time sufficient to produce said self-supporting body comprising at least one parent metal boron-containing compound.

11. The method of claim 10, wherein said venting means comprises a plurality of through-holes in the graphite mold.

12. The method of claim 10, wherein said venting means comprises a plurality of through-holes in the graphite mold, said through-holes being located in the graphite mold at a position corresponding to the direction of said infiltration reaction of the parent metal into the mass of boron carbide.

13. A method for producing a self-supporting body, which comprises:
    selecting a parent metal comprising at least one metal selected from the group consisting of titanium, zirconium, hafnium, vanadium, chromium and niobium;
    heating said parent metal in a substantially inert atmosphere to a temperature above its melting point to form a body of molten parent metal, and contacting said body of molten parent metal with a permeable mass comprising boron carbide;
    maintaining said temperature for a time sufficient to permit infiltration of molten parent metal into said mass and to permit reaction of molten parent metal with said boron carbide; and
    continuing said infiltration and reaction for a time sufficient to react said boron carbide substantially completely to produce said self-supporting body.

14. The method according to claim 13, further comprising forming said mass by admixing said boron carbide with an inert filler, permitting said infiltration and reaction into said mass to embed said filler, and producing a composite as said self-supporting body.

15. The method according to claim 13 or claim 14, wherein said body comprises a metallic phase.

16. The method according to claim 13 or claim 14, wherein said self-supporting body comprises at least one parent metal boron-containing compound and at least one parent metal carbon-containing compound formed upon reaction of said mass comprising boron carbide and said parent metal.

17. The method according to claim 13 or claim 14, wherein said mass comprising boron carbide is present in at least a stoichiometric amount with respect to the parent metal infiltrated into said mass.

18. The method according to claim 13 or claim 14, wherein carbon is incorporated into said mass for reaction with said parent metal.

19. The method according to claim 16, wherein said parent metal comprising at least one metal selected from the group consisting of titanium, zirconium, and hafnium.

20. The method of claim 18, wherein said carbon comprises from about 5 to about 10 percent by weight of said mass.

21. The method according to claim 13 or claim 14, wherein said parent metal comprises zirconium, and said self-supporting body comprises a zirconium compound selected from the group consisting of a boride of zirconium or a mixture of a boride of zirconium and a carbide of zirconium.

22. The method according to claim 21, wherein said self-supporting body further comprises zirconium.

23. The method according to claim 13 or claim 14, wherein said mass comprises a preform of predetermined shape, and said infiltration and said reaction into said preform produce a self-supporting body having a configuration corresponding to said preform.

24. The method according to claim 14, wherein said filler comprises at least one filler selected from the group consisting of fibers, whiskers, particulates, powders, rods, wires, wire cloth, refractory cloth, reticulated foam, plates, platelets, solid spheres, and hollow spheres.

25. The method according to claim 23, wherein said filler further comprises a protective precoat.

26. The method according to claim 14 or claim 25, wherein said filler comprises at least one filler selected from the group consisting of alumina and carbon with a protective precoat.

27. The method according to claim 13 or claim 14, wherein said parent metal comprises titanium, and said self-supporting body comprises a titanium compound selected from the group consisting of a boride of titanium or a mixture of a boride of titanium and a carbide of titanium.

28. The method according to claim 13 or claim 14, wherein said parent metal comprises hafnium, and said self-supporting body comprises a hafnium compound selected from the group consisting of a boride of hafnium and a mixture of boride of hafnium and a carbide of hafnium.

29. The method according to claim 27, wherein said self-supporting body further comprises titanium.

30. The method according to claim 28, wherein said self-supporting body further comprises hafnium.

31. The method of claim 13 or claim 14, wherein at least one of said parent metal boron-containing compounds exhibits a platelet-like structure.

32. The method of claim 21, wherein said boride of zirconium exhibits a platelet-like structure.

33. The method of claim 27, wherein said boride of titanium exhibits a platelet-like structure.

34. The method of claim 28, wherein said boride of hafnium exhibits a platelet-like structure.

35. The method of claim 4, further comprising admixing an inert filler with said mass, permitting said infiltration and reaction into said mass to embed said filler, and producing a composite as said self-supporting body having a matrix embedding said filler, said matrix comprising a metallic phase of unreacted constituents of the parent metal and at least one parent metal boron-containing compound.

36. A self-supporting composite body comprising at least one metal phase selected from the group consisting of zirconium, titanium and hafnium, and a three-dimensionally interconnected ceramic phase extending to the boundaries of said composite body, said ceramic phase comprising at least one carbide selected from the group consisting of a carbide of zirconium, a carbide of titanium, and a carbide of hafnium, and said composite body further comprising a boride of the metal corresponding to said carbide, said boride having a platelet-like structure.

37. The composite body of claim 36, wherein said metal phase comprises zirconium, said carbide comprises a carbide of zirconium, and said boride comprises a boride of zirconium.

38. The composite body of claim 37, said composite body possessing a fracture toughness of at least about 12 MPa m$^{\frac{1}{2}}$.

39. The method of claim 1, wherein said parent metal comprises at least one metal selected from the group consisting of titanium, zirconium, and hafnium.

40. The method of claim 1, wherein said parent metal comprises zirconium.

41. The method of claim 13, wherein said parent metal comprises at least one metal selected from the group consisting of titanium, zirconium, and hafnium.

42. The method of claim 13, wherein said parent metal comprises zirconium.

43. The method of claim 4, wherein said parent metal comprises at least one metal selected from the group consisting of titanium, zirconium, and hafnium.

44. The method of claim 4, wherein said parent metal comprises zirconium.

* * * * *